J. A. TOPPING.
LAMP.
APPLICATION FILED NOV. 20, 1918.

1,324,942.

Patented Dec. 16, 1919.
2 SHEETS—SHEET 1.

Witnesses:
Robert H. Weir
Arthur W. Carlson

Inventor
John A. Topping
Fonée Rain & Bean
Attys.

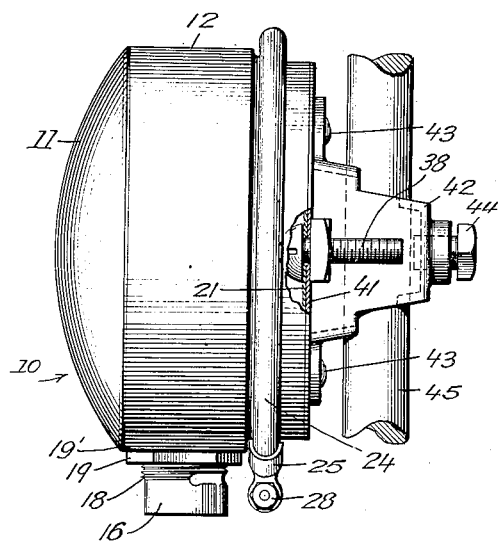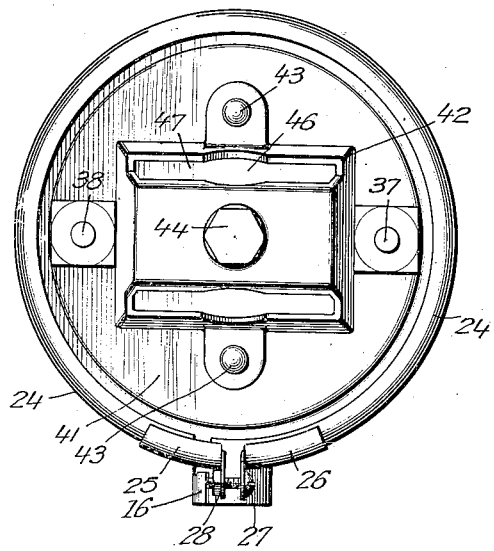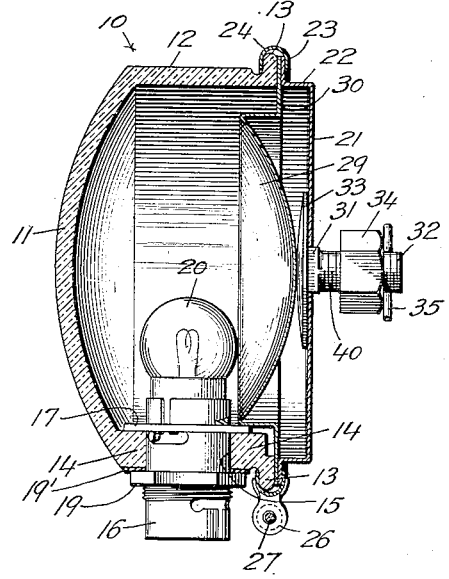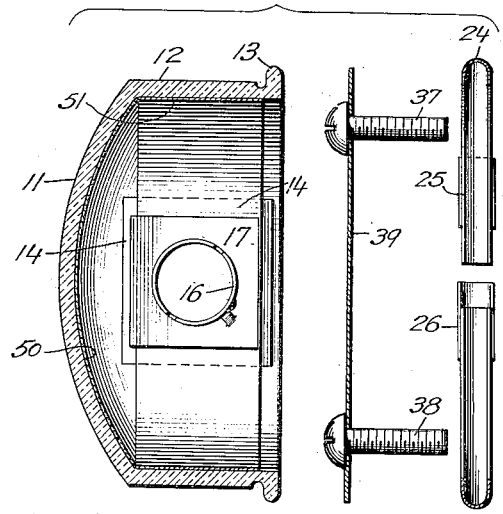

UNITED STATES PATENT OFFICE.

JOHN A. TOPPING, OF CHICAGO, ILLINOIS.

LAMP.

1,324,942.    Specification of Letters Patent.    Patented Dec. 16, 1919.

Application filed November 20, 1918. Serial No. 263,409.

*To all whom it may concern:*

Be it known that I, JOHN A. TOPPING, a citizen of the United States, residing at Chicago, in the county of Cook and State of Illinois, have invented certain new and useful Improvements in Lamps, of which the following is a specification.

My invention relates to improvements in lamps.

One of the objects of my invention is to provide an efficient, ornamental, and cheaply to construct lamp, which is arranged for universal application and adapted for many advantageous uses.

One of the particular objects of my invention is the production of a lamp that may be used for divers purposes and in many places on automobiles, boats, or other like vehicles.

The body part of my lamp constituting the lens or front closure, rear cylindrical rim and flange at the rear end of the rim, is made in one integral part of substantially transparent or diaphanous material, such as molded glass, or the like, the attaching means for supporting the structure being associated with the metal back plate or closure for the rear end of the glass parts.

Without departing from the principles involved in my invention, the lamp may conveniently be adapted for use as a "tail light", "side lights", "spot lights", "head lights" and a "trouble light", and any one of the usual and various means of attaching and supporting the lamp to a fixed part of the vehicle may interchangeably be adopted.

When the lamp is used for a head light or projector, the light therefrom is not only projected forwardly through the lens, as usual with lamps of this character, but a very appreciable volume of the light is radiated laterally through the substantially transparent integral rim, which, preferably, is made of glass and within the range of which there are no obstructions to impede or prevent the radiation of light.

When used as a tail light, for illuminating an adjacent indicating plate, bearing a license number, part of this rim may be left open or clear and the remaining part may be lined with a sheet of colored translucent or diaphanous material, such as a strip of green celluloid, or the like, and in the arrangement of the strip within the lamp, regarding the open space, whether on the right or left, it is conveniently adaptable for either side, to properly illuminate the number plate, because the celluloid strip may be changed so that an uncovered or clear portion of the rim will confront the license plate, when the plate is on the right or the left hand side thereof.

When the lamp is made somewhat larger and used for side lights or for head light projectors, the translucent colored strip may be left out entirely so that the lamp will radiate lateral rays of light to illuminate the surrounding area as well as to project the light forwardly, as in lamps of this sort.

When the lamp is to be used as a spot light, as in side lights and head lights, a projecting lens may be placed in the back of the casing structure and the side rim or cylinder part may be covered with an opaque or colored lining as the fancy of the owner or the prevailing legal regulation may direct. By attaching a handle to the socket of the lamp, it may conveniently be used, when arranged for the purpose of a spot light, as a "trouble light", that is to say, a lamp that is portable and adaptable for use in and around the machine, to facilitate repairs, so that the lamp in this way becomes universal and adaptable to all uses in which it may be of advantage in the operation of automobiles, boats and the like.

In the accompanying drawings

Fig. 4 is a side elevation of the lamp, showing one means of attaching it to a support.

Fig. 5 is a rear elevation of the same view.

Fig. 6 is a central section taken on line 6—6 of Fig. 1.

Fig. 7 is a longitudinal center section of the diaphanous body or substantially transparent part of the lamp and one form of closure ring by which the rear closure plate is clamped to the body part of the lamp, to close the open end of the cylinder or rim.

In all the views the same reference characters are employed to indicate similar parts.

Figure 1:
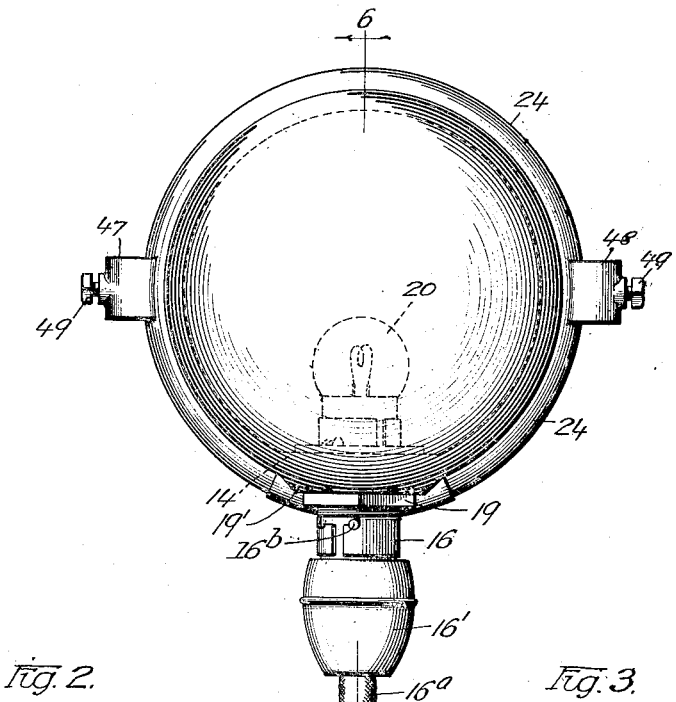
Figure 1 shows a front view of the lamp when enlarged and adapted to be employed as a projector or headlight.
Figure 2:
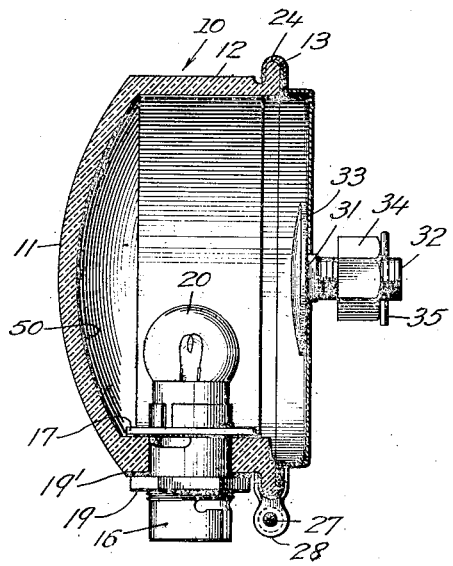
Fig. 2 is a central section, in elevation, of one form of the lamp.

10 is a body or glass part of the lamp, consisting of the front disk portion 11, and the integral side rim 12, having a laterally projecting flange 13 of the same material. The lower part 14 of the rim is flat and thicker, having parallel inside and outside surfaces, and having a bore or aperture 15 within which to insert a lamp socket 16.

The flat portion 14 contains an orifice through which the socket 16 passes and within which it is fastened by any suitable means, one means consisting of a plate 17 suitably fixed to the upper part of the socket. The lower part of the socket is screw threaded, as at 18, for a nut 19, to hold the socket in place. Suitable liners or gaskets may be used in connection therewith, if found necessary, as at 19'.

Any convenient and sufficient means for holding the socket in the body part of the lamp will come within the contemplation of my invention. 20 is a light bulb adaptable for insertion in the socket.

A dish-shaped circular plate 21, having an inturned annular part 22 and an outwardly extending flange 23 serves as a closure for the rear end of the cylinder part of the lamp. The plate is held in place by a split spring ring 24 which is U-shaped in cross section and which is provided with terminals 25 and 26 held together around the edge of the flange 23 of the closure plate and the flange 13 of the cylindrical part of the lamp, by means of a clamping screw 27, which passes through the terminals 25 and 26 into a nut 28. 29 is a reflector or projector which may constitute the closure and which has an extending flange 30 that may be included with the flange 23 of the plate 21 under the U-shaped clamping ring 24, when two closure plates are used. The lamp shown in Fig. 6 may be used as a spot light, the projector 29 serving as a means for projecting the light, in the proper manner, as used in lamps of this character. The concavity of the reflector may take the form of a parabola for lamps intended for spot light or head light purposes.

Figure 3:
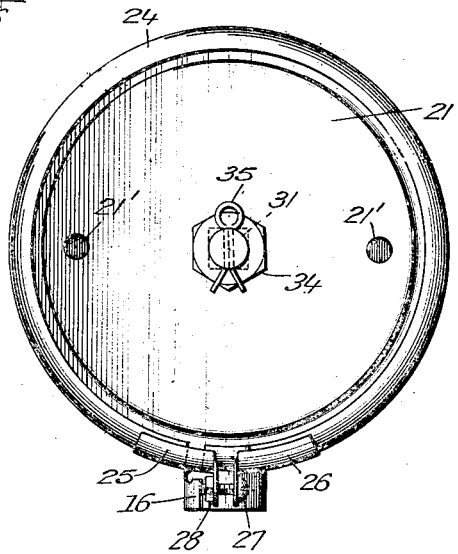
Fig. 3 is a rear view of the lamp shown in Fig. 2.

The plate 21 is provided with a square perforation, as at 31, shown in Fig. 3, for a square shank bolt 32, which is provided with a relatively large flat head 33 and a nut 34. A cotter pin 35 may pass transversely through the bolt 32 through a perforation made therein for the purpose of preventing the nut from becoming loose and falling from the end of the bolt. This is the form of fastening used on the Ford car.

The plate 21 may also be perforated, as at 21', for screws 37 and 38 which afford another means for attaching the lamp to a fixture adapted to receive them, which constitutes a fastening means used by a different type of car. The plate 39 in Fig. 7 is straight instead of being dish-shaped as shown in Fig. 6, exemplifying the adaptability of a straight plate or disk, instead of the dish-shaped plate or disk, when the projector 29 is not intended to be used.

The plate 39 may also be provided with a square perforation 40, adapted for use with a bolt 32, when the screws 37 and 38 are not to be employed for that purpose.

Another form of flat plate, indicated by 41, shown in Figs. 4 and 5, provided with a bracket 42 secured thereto by rivets 43 and having an attaching set screw 44 to set up on the support 45, to which the lamp may be attached, may be employed as another means for securing the lamp in place. This bracket is provided with an opening 46 to receive the rod 45 and is laterally slotted, as at 47, to permit the insertion therein of a relatively wide and flat bar, instead of the round rod 45, the set screw 44 being employed also for securing the lamp structure on the flat bar.

When the lamp is to be used for a head light projector and made larger for this purpose, attaching means for supports used on the front end of a car may be secured to the opposite edges of the clamping ring 24, as at 47 and 48, shown in Fig. 1, the set screws 49 being used to clamp the lamp to the parallel vertical supports or rods.

The electrical attaching plug 16' having the conducting wires or cable 16ª connected thereto is adapted for connection with the socket 16. The lamp socket is provided with a double bayonet slot, and the plug is provided with a pin 16ᵇ which enters the slot. When the plug is turned in one direction, it opens the circuit including the lamp 20, and when turned in the opposite direction, it closes the circuit for the lamp, so that the plug may be used as a means for switching the current on or off the lamp. This is especially convenient when the lamp is used as a tail light. The disk 41 may be flat, the same as disk 39, and it may be attached to the dished disk or plate 21 by screws 37 and 38, as shown in Figs. 4 and 5.

My lamp structure is especially adaptable for use as a tail light for automobiles for the reason that the relatively inexpensive substitutable closure plate may be made to fit any supporting attachment that may be provided on automobiles of different type and manufacture and furthermore the inexpensive and universal adaptability of the means employed for illuminating the side areas through the rim 12 of the lamp, in either direction, or of any portion thereof, renders the lamp especially serviceable and highly appreciated by the jobbers and retail dealers because of the fact that a large variety of styles of lamps are not necessary to be carried in stock to supply any demand.

The lens 11 of the lamp, may be "splashed" on the inside with colored glass, such as 50, or it may be lined with a sheet of colored celluloid, either as at 50, or by a colored celluloid strip 51, the latter may be green and the former red and the strip may be made to extend to any limited extent or entirely around the inside surface of the cylinder or rim 12. A clear open illuminated space on either side, interchangeably, may be left to permit the light to be radiated upon the adjacent license plate, or the colored feature may be entirely omitted and this is especially desirable when the lamp takes the form shown in Fig. 1 or in Fig. 6, and furthermore the lens 11 may be made of any configuration corresponding with the ordinary bull's eye of a signal lamp, for example.

Inasmuch as all the parts are interchangeable, the destruction or loss of any part may be quickly and cheaply replaced and any form of lamp may be furnished by use of the desired parts.

In the description and claims I have used the word "diaphanous" to mean that the diaphanous parts may be made of substantially transparent material, such as clear glass, or partly transparent or translucent material, such as colored glass, or clear glass lined with translucent material, such for example, as thin sheets of colored celluloid, or the like.

While I have herein shown a single embodiment of my invention for the purpose of clear disclosure it will be manifest to persons skilled in the art that changes may be made in the general arrangement and configuration of the parts within the scope of the appended claims.

Having described my invention, what I claim is:—

1. A lamp providing a front closure and a rearwardly extending rim of substantially uniform diameter, made in one integral piece of diaphanous material, said rim having a perforation within which to insert a lamp socket; a disk closure attachable to the rear open end of said rim and providing attaching means for supporting the lamp and an insertion strip lining in said rim, having a portion cut away to permit light to pass through that part of the unobstructed rim.

2. A lamp comprising a casing having a cylindrical rim closed at one end by an outwardly flaring disk-like wall, said parts made of glass and being of substantially uniform thickness, except at one part of the rim providing a perforation around which the rim is thicker, the inner boundaries of the thick portion being parallel with the outer boundaries thereof, said cylindrical part terminating at its open end in an integral radially extending flange; a sheet metal disk of a diameter substantially the same as that of the flange and a U-shaped ring encompassing the metal disk and the flange to hold the parts together.

3. A one piece glass lamp having a cylindrical rim and a globe-like integral closure for one end, said rim providing a relatively thicker portion having parallel inside and outside surfaces surrounding a perforation therein to receive a lamp socket and a socket extending through said perforation into said cylinder, having clamping parts to engage the parallel inside and outside surfaces of the thick portion of the rim, and a closure for the open end of the cylinder carrying a support for the lamp.

4. A lamp having in combinative association a one piece housing member of glass comprising a relatively short cylindrical rim closed at one end by a globe-like closure and having at the other end a surrounding radially projecting bead and provided in the cylindrical rim with an opening within which to insert a lamp socket; a closure for the other end of the cylinder and a U-shaped ring to hold the latter closure in contact with the open end of the cylinder.

In testimony whereof I hereunto affix my name.

JOHN A. TOPPING.